United States Patent Office 3,487,014
Patented Dec. 30, 1969

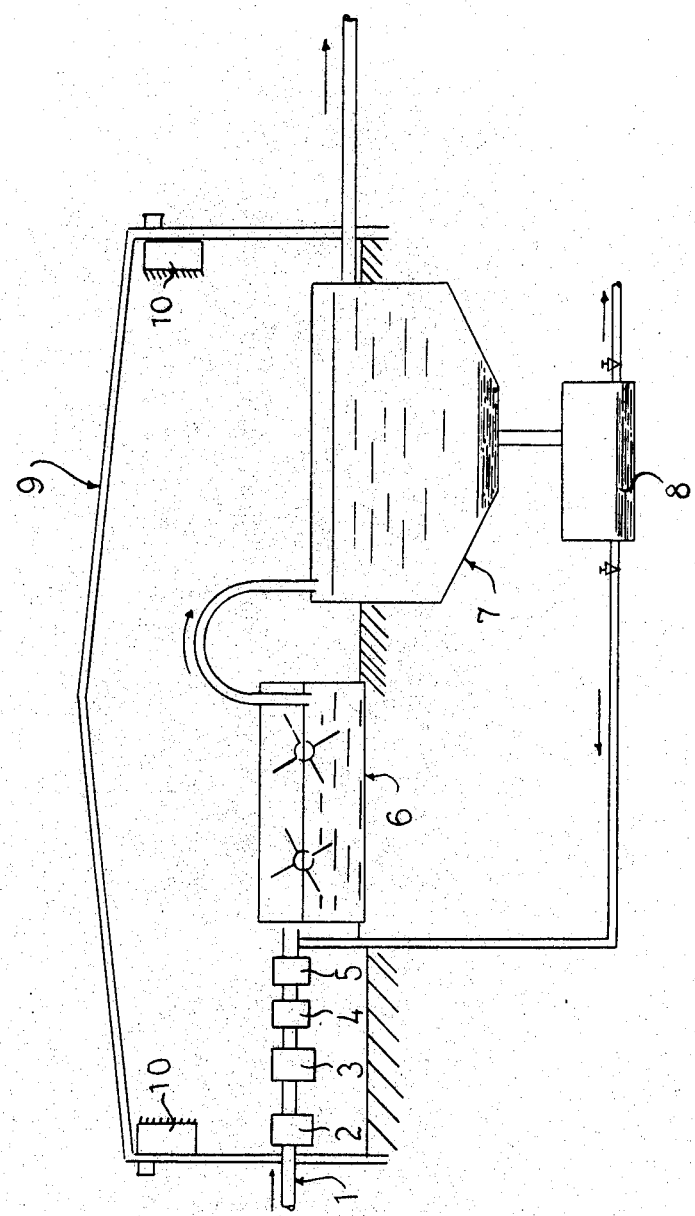

3,487,014
METHODS OF IMPROVING AND SAFEGUARDING
THE FUNCTION OF BIOLOGICALLY OPERATING PURIFICATION PLANTS
Johan Ragnar Liljegren, 4 Ulasgatan,
794 OO Orsa, Sweden
Filed May 20, 1968, Ser. No. 730,566
Claims priority, application Sweden, May 23, 1967,
7,168/67; Jan. 11, 1968, 336/68
Int. Cl. C02c 1/06
U.S. Cl. 210—4                                    1 Claim

ABSTRACT OF THE DISCLOSURE

A method of improving and safeguarding the function of biologically operating sewage purification plants. It is known to purify water by aerating the water in pools containing a culture of bacteria, so-called active sludge, and by leaving the water more or less undisturbed, at which sedimentation and/or flotation takes place so that the impurities forming flocks by the action of the active sludge will sink to the bottom or rise to the surface thus allowing their removal from the water. In order that this procedure shall proceed at the desired rate and intensity there is required a given minimum temperature which could not be reached during the cold season in the previously known outdoor plants. The novel features of the present method comprise arranging, at the inlet to the purification plant which has pools housed in insulated premises separated from external air, means for measuring the quantity and temperature of the influent, and providing means for supplying to said premises an air volume adapted to the requirements of the biological process and to the ventilation of the premises, said air having a temperature at least equally high as that of the influent and preferably some degrees higher than the temperature of the influent, the air temperature being controlled by the means sensing the water temperature while the air volume is controlled from the means sensing the quantity of the influent.

---

This invention relates to a method of improving and safeguarding the function of biologically operating purification plants.

It is well known that the temperature of sewage and ambient air greatly affects the function of biological plants for the purification of sewage. Practical experiments have shown that the active bacterial flora has its maximum activity within a range of water temperature from between 7° and 14° C.

In purification plants located in countries where the temperature during some parts of the year lies about or below 0° C. it has been found that the desired biological degradation of sewage constituents is considerably impeded when the water temperature by reason of the cool ambient air sinks and approaches a temperature range of from +2° C. to +4° C. and practically altogether stops at temperatures about 0° C. For the elimination of this problem it has already been suggested to heat the sewage but for economical reasons such a solution is not feasible because of the very large quantities of sewage concerned.

The present invention is based upon the discovery that the temperature of the sewage when entering the purification plant, irrespective of the season, is approximately constant and as a rule lies in the range of from 7° to 14° C., i.e. the temperature is insufficient for maintaining a fully acceptable biological degradation process. However, owing to the effect of the air temperature, as already mentioned, the temperature of the sewage in winter sinks in the previously known purification plants to a temperature range of below 4° C. and often to one or two degrees above 0° C. and, as mentioned above, this results in the biological process ceasing altogether. In practice, this implies that no appreciable biological purification of the sewage occurs in winter in the purification plants as presently used, where the sewage enters into intimate contact with the ambient air by way of mechanical aeration and in sedimentation pools having large water surfaces. What actually occurs in such purification plants may be attributed primarily to a purely mechanical sedimentation, and it follows from this that in winter sewage is allowed to escape in a practically non-purified state into the receiver. One solution of the above-mentioned problems is to locate the purification plant in premises insulated from external air, but in premises of so large capacities as those herein concerned and having so large open water surfaces it has been found extremely difficult to provide for a ventilation which is acceptable from hygienic, economical and functional aspects.

The present invention has for its object to eliminate in an economically feasible way any deleterious effects on the biological purification process, which are caused by temperature variations. To this end, the method of the invention is characterised by the steps of arranging means for measuring the quantity and temperature of the influent in the purification plant, and providing means for supplying to said premises an air volume adapted to the requirements of the biological process and to the ventilation of the premises, said air volume having a temperature at least equally high as and preferably some degrees higher than that of the influent, the air volume being controlled in relation to the quantity of influent and the air temperature being controlled in relation to said temperature of the influent.

The above method will be more fully described in the following with reference to the accompanying drawing which diagrammatically shows a purification plant adapted to operate in accordance with this invention.

The sewage enters the illustrated plant through the conduit 1 which is equipped with means 2 for separating solid matter and/or suitably a comminuting device 3. The comminuting device is of a construction that provides comminution of solid matter in the sewage to a particle size of one or two mm., and this implies that such solid matter, if of organic origin, is influenced by and partakes in the biological degradation process. Mounted in the supply conduit are means 4 sensing the sewage temperature and a volumeter 5. It wil be understood from the following how these apparatus function. From the inlet the sewage flows to a per se known aeration pool 6 where air is supplied to it mechanically by agitators or by blowing. The aerated water thus enriched in oxygen is then caused to enter a sedimentation and/or flotation pool 7 where it is kept for a given time during which sludge and flocks will sink to the bottom or rise to the surface of the pool. The waste water from said pool may escape into the receiver, but it can also be treated in further steps for removal of nutritive salts and the like. The sludge separated in the sedimentation and/or flotation pool can either be transported to a sludge tank 8 or be returned to the aeration pool 6 there to activate the influent by reason of its bacteria content which has increased during the sludge separation. The sludge in the sludge tank 8 is preferably dewatered mechanically, whereupon it can be subjected to further treatment and preferably be exploited as a constituent part of soil improving compositions.

The novel features of the present invention reside in that the aeration pool as well as the sedimentation and/or flotation pools are disposed in premises 9 insulated and separated from external air, said premises having means 10 for controlled supply of air. As mentioned in the introduction, it is not economically feasible to try to increase the temperature of the sewage. Instead, the temperature of the supplied air is influenced in the present invention. The temperature of the air is determined by the temperature of the influent with the aid of the earlier mentioned sensing means 4 so that the air temperature is kept higher than and does not sink below the water temperature. The supplied air volume is so adjusted to the quantity of the influent that the air required for the biological process and the ventilation of the premises is supplied from the outside. Even if the external temperature is low and lies about or below 0° C. the air need not thus be heated to more than a temperature one or two degrees higher than that of the sewage. This implies in practice that the air temperature in the premises will be kept at or immediately below +10° C.

The application of the method described above, irrespective of the season, produces an active bacterial flora and a good flocculation of the impurities in the water. As a result, the efficiency of the biological process can be maintained at a high level and it follows that the biological purification of the sewage will be excellent. Keeping the air temperature above the water temperature will prevent moisture and condensation water from forming in the space above the pools.

While the invention has been described in a preferred embodiment in the foregoing with reference to the accompanying drawing those skilled in the art will readily understand that the invention can be modified within the scope of the appended claim.

What I claim and desire to secure by Letters Patent is:

1. A method of purifying water with the aid of active sludge in a purification plant having pools for aeration and sedimentation and/or flotation in which under the influence of the bacterial flora in the sludge the organic constituents of the sewage form a sludge and flocks which are separated from the water, the pools for aeration, sedimentation and/or flotation being housed in premises separated from external air, comprising the steps of arranging means for measuring the quantity and temperature of the influent in the purification plant, and providing means for supplying to said premises an air volume adapted to the requirements of the biological process and to the ventilation of the premises, said air volume having a temperature at least equally high as and preferably some degrees higher than that of the influent, the air volume being controlled in relation to the quantity of influent and the air temperature being controlled in relation to said temperature of the influent.

References Cited

FOREIGN PATENTS 652,585   11/1962   Canada.

OTHER REFERENCES

Keefer, C. E., Sewage Treatment Works, First edition, 1940, McGraw-Hill, N.Y., pp. 423–424 relied on.

MICHAEL E. ROGERS, Primary Examiner

U.S. Cl. X.R.

210—12, 175